United States Patent [19]

Barlow et al.

[11] Patent Number: 4,989,422

[45] Date of Patent: Feb. 5, 1991

[54] SOUND ABSORBENT SLEEVING PRODUCT

[75] Inventors: Richard A. Barlow, Newtown Square, Pa.; Thomas B. Conaghan, Rock Hall, Md.; Harry F. Gladfelter, Phoenixville, Pa.; J. Sellers Kite, III, West Chester, Pa.; Peter J. Mimmo, Cleamery, Pa.

[73] Assignee: The Bentley-Harris Manufacturing Company, Lionville, Pa.

[21] Appl. No.: 354,525

[22] Filed: May 19, 1989

[51] Int. Cl.$^5$ .......................... D04B 1/14; D04C 1/02; F16L 11/02

[52] U.S. Cl. ............................................ 66/170; 87/9; 87/6; 138/125; 138/127; 428/224

[58] Field of Search ........................ 66/170; 87/3, 5, 7, 87/8, 9; 138/125, 127

[56] References Cited

U.S. PATENT DOCUMENTS

| | | | |
|---|---|---|---|
| 2,114,274 | 4/1938 | Hubert | 87/7 |
| 2,250,863 | 7/1941 | Goodloe | 66/190 |
| 2,335,088 | 11/1943 | Shoemaker . | |
| 3,022,802 | 2/1962 | Lewis | 138/125 |
| 3,306,288 | 2/1967 | Rosenfield | 66/170 X |
| 3,315,559 | 4/1967 | Cohen . | |
| 3,481,368 | 12/1969 | Vamsickle et al. | 138/125 |
| 3,500,867 | 3/1970 | Elson | 138/125 |
| 3,815,468 | 6/1974 | Matt et al. . | |
| 3,886,980 | 6/1975 | Elson | 138/127 |
| 4,158,984 | 6/1979 | Griffiths . | |
| 4,259,991 | 4/1981 | Kutnyak | 138/127 |
| 4,276,908 | 7/1981 | Horne | 138/125 |
| 4,463,652 | 8/1984 | Monget et al. . | |
| 4,484,024 | 11/1984 | Bentley, Jr. . | |
| 4,576,081 | 3/1986 | Felthuis et al. | 87/8 X |
| 4,794,767 | 1/1989 | Lombardi . | |
| 4,836,080 | 6/1989 | Kite, III et al. | 87/9 |

FOREIGN PATENT DOCUMENTS

| | | |
|---|---|---|
| 0117057 | 8/1984 | European Pat. Off. . |
| 0148100 | 7/1985 | European Pat. Off. . |
| 8603050 | 5/1986 | PCT Int'l Appl. . |
| 1997354 | 7/1965 | United Kingdom . |
| 2082213 | 3/1982 | United Kingdom . |
| 2218312 | 11/1989 | United Kingdom . |

*Primary Examiner*—Werner H. Schroeder
*Assistant Examiner*—John J. Calvert
*Attorney, Agent, or Firm*—John T. Synnestvedt; Charles H. Lindrooth

[57] ABSTRACT

Tubular sleeves of braided, knited or woven construction comprised of bulky continuous filament yarns and a resilient engineered plastic monofilament have excellent noise reduction characteristics. The bulky yarn provides a flexible cushion for cables and tubes covered by the sleeves thereby reducing vibration induced wear. The resilient monofilament gives the sleeve material sufficient hand so that sleeves formed according to the invention tend to assume the open position without loss of the ability to deaden sound and cushion vibration.

9 Claims, No Drawings

SOUND ABSORBENT SLEEVING PRODUCT

FIELD OF THE INVENTION

This invention relates to protective woven, knitted, or braided fabric sleeve-type coverings for products subject to vibration, thereby creating undesirable noise. More particularly, the invention relates to sleeve type products formed in major part from bulky yarns for the purpose of bundling elongated articles such as wires or cables. A particular application is found in the automotive industry for sleeving for bundling wires or tubes where they exist within confined spaces.

DESCRIPTION OF THE PRIOR ART

The need for an economical, protective covering for bundling loose items such as cables, particularly under vibrating conditions, whether hot or cold, is well known in the art. For many applications, such sleeving materials are desirably formed of interthreaded, loose, bulky yarns as these materials have excellent sound absorbency characteristics. However, sleeving formed of such yarns tends to be limp and raggy and difficult to slide over or fit around a bundle of wires or other elongated substrates.

Nothing in the following prior art taken singularly or together, has addressed these conditions or has suggested the invention disclosed herein which overcomes these conditions.

U.S. Pat. No. 4,484,024 discloses a tubular bulky sleeve interthreaded from bulky (i.e. low density, high surface area) yarns and an overcoating.

U.S. Pat. No. 4,158,984 describes using yarns of two different wires to form a braid. One wire has high durability and low tensile strength and the other has a low durability and high tensile strength. The flexibility of the material is different for either wire. The material is costly, and is suitable only for covering high fluid pressure hoses. Sound absorbency is not addressed and would not be provided by this material.

U.S. Pat. No. 3,815,468 describes using a braided fabric of Teflon filaments and high temperature nylon filaments in which the filaments are washed with solvents to remove the sizing and then impregnating each fiber with a resin. These types of fabrics are useful for bearing surfaces, but are expensive and unsuitable for covering items such as automotive hoses, where the impregnated resin burns away and flakes off.

U.S. Pat. No. 2,335,088 describes the use of two fabric covers for electric wiring to prevent festooning. This is opposite to Applicants use of only one cover.

Commercially available knitted or braided sleeves formed of loose, bulky yarns are sold under the trademark QUIETSLEEVE by Bentley-Harris Manufacturing Company, Lionville, Pa.

SUMMARY AND OBJECTS OF THE INVENTION

The flexible fabric sleeve products of this invention are for protecting and covering bundles of hoses, tubes and wiring used under abrasive and vibrating conditions such as tubing and cables which extend into a confined space and produce undesirable vibration induced noise in a space such as the interior of an automobile door. The fabric sleeve products of the invention are comprised of a first, bulky yarn which provides a cushioning effect for the substrate being bundled and a second high modulus monofilament yarn such as polyester or other engineered plastic material. The first and second yarns are interthreaded, preferably by knitting or braiding, and the number of monofilaments are from 25 to 75 per cent of the total number of strands of the first yarn and second yarn. The fabric sleeve product has a sound absorbency substantially equal to the sound absorbency of a fabric sleeve made only of the first yarn. The second yarn is distributed throughout the fabric to form a matrix and is present in quantity to give the fabric sufficient hand to cause sleeves so formed to stay open so that they resist collapse and readily open up when they are fitted over a bundle of wires. In flat products, the improved hand will resist the tendency of the material to fold over upon itself and will facilitate wrapping of a substrate.

DESCRIPTION OF THE PREFERRED EMBODIMENT OF THE INVENTION

The knitted, woven, or braided articles formed from the teachings of this invention are useful for many different protective coverings of products used under vibrating conditions and particularly those used under vibration conditions like the wiring within doors and other confined, inaccessible areas in trucks, buses and cars.

The flexible articles are made from a first and a second yarn. The first yarn is relatively loose bulky yarn of a material such as polypropylene, although a variety of yarns, either man-made or natural or mixtures thereof may be used. The material is chosen based on the articles to be protected, the type of environmental conditions, and the costs of such material. Generally stated, for automotive applications, materials which are moisture repellant or moisture resistant are preferred. Bulky yarns typically have a density of about 70% or less, preferably from about 40% to about 60% and most preferably from about 45% to about 55% of the density of nonbulky yarns of the same composition and diameter. The bulky yarns may be either continuous filament or short filament spun yarn.

The second yarn is a resilient monofilament material preferably formed of an engineered plastic material. The resilient monofilament useful in this invention should have sufficient tensile modulus to provide the desired springback characteristic in the braided sleeving. Preferably, the fiber or yarn used as the second yarn is polyester but it will be appreciated that any of the family of plastics known as engineered plastics are suitable for use in the sleeves of the invention. By engineered plastics in this context, it is meant that the plastic has a tensile modulus of greater than 100,000 psi and preferably greater than 150,000 psi and more preferably at least 200,000 psi. Examples of engineered plastics are the olefin polymers, of which some preferred olefin polymers are high density polyethylene, polypropylene, polybutene-1, poly 4-methyl pentene and fluorinated polyolefins such as ethylenetrifluorochloroethylene copolyers, ethylenetetrafluoroethylene copolymers and vinylidene fluoride polymers, especially polyvinylidene fluoride and blends thereof, for example, the fluorinated olefin blends as described in British patent No. 1,120,131; polyesters, for example, polyethylene terephthalate, polytetramethylene terephathalate for example those treated as described in U.S. Pat. Nos. 3,968,015; 4,073,830 and 4,113,594; polyphenyleneoxide and -sulphide, blends of polyethylene oxide with polystyrene, silicone-carbonate block copolymers, polyketones, such as polyarylether ketones, for example, those described in U.S. Pat. Nos. 3,953,400; 4,024,314; 4,229,564; 3,751,398; 3,914,298; 3,965,146; and 4,111,908; polysulphones, for example polyaryl sulphones, polyarylether sulphones, polyetherimides, for example those described in U.S. Pat. No. 3,847,867, polycarbonates especially those derived from bis phenol-A, polyamides, especially those described in U.S. Pat. Nos. 3,551,200 and 3,677,921, epoxy resins and blends of one or more of the above mentioned polymeric materials either with each other or with other polymeric materials. Additional discussion of such materials is found in British Specification No. 1,529,351. The disclosures of the above patents and specifications are incorporated herein by reference. Polyphenylene sulphide monofilaments sold by Philips under the registered trademark Ryton and having a tensile modulus of 1,000,000 psi and monofilaments formed of PEEK (poly ether ether ketone) having a tensile of 750,000 psi may be employed. The diameters of the first and second yarns vary depending upon the size of the article and the product for which it is intended that the sleeve be used, but preferably that of the second yarn is from about 7 to about 12 mils in diameter.

The sleeve type coverings described herein are formed by weaving, knitting or braiding together the first and second yarns. The number of monofilaments are from 25 to 75 per cent or more of the total number of yarns used in the making of the articles of this invention. The number chosen is based on the particular use, environmental conditions, costs, and the article or articles to be covered. Preferably the second yarn is uniformly distributed throughout the knitted, woven or braided article. The choice of the number of monofilaments is such as to impart sufficient hand to the product so that tubular articles tend to open up and flat articles tend to stay flat. Preferably the number of ends of the second yarn to the number of ends of the first yarn is from about one to one to three to one, but more preferably from two to one end of the first yarn. The bulky yarn of this invention should allow for intimate contact with the conductors or tubes being bundled and should preferably allow for axial compression so as to permit temporary access to the conductors being protected.

Preferably the flexible sleeve type coverings made according to the invention described herein are made by braiding or by circular knitting, and in the braiding or knitting the monofilament yarns are evenly spaced. In a braiding operation, the first yarn and the second yarn may each be fed off of separate bobbins or carriers on the braider or may be combined in desired ratios on the carriers. A preferred method of braiding is to have the number of carriers of the first yarn be 32 and that of the monofilament be 32 and the number of ends per carrier for the first yarn be 1 and for the second yarn be 2 . The monofilament yarns should be evenly spaced about the deck of the braider with half going in one direction and half in a second direction opposite to the first direction.

EXAMPLE 1

A braided sleeve of approximately one inch O.D. was formed from one end of a first, bulky, continuous polypropylene yarn having a density of about 70% less than the density of non bulky yarn of the same composition and diameter, said yarn having a 1.1 cotton count or about 930 yards per pound to two ends of polyester monofilament 10 mils in diameter. The monofilament polyester employed has a tensile modulus of 100,000 psi and is available under the trademark Estralyn from Johnson Filament of Williston, Vt. The two ends of monfilament polyester and one end of polypropylene are loaded onto 64 carriers on a braider and braided into a one inch O.D. sleeve. The sleeve so formed has 64 ends of monofilament and 32 ends of bulky yarn. The sleeve has sufficient hand so that it tends to assume the open position readily without undue manual manipulation. The presence of the monofilament did not discernably impair the sound absorbency properties of the first yarn.

EXAMPLE 2

A knitted sleeve of approximately one inch O.D. made on a circular knitter using a first, bulky, continuous filament polypropylene yarn and a polyester monofilament as per example 1. The monofilament was yarn that was uniformly distributed throughout the sleeve, there being one end of bulky yarn to every two ends of monofilament yarn. The sleeve so produced was coated with Milease ® F15, a fluorochemical water repellent sold by ICI to reduce moisture absorbency.

What is Claimed is:

1. A textile sleeve for the bundling of elongated substrates said sleeve comprising interthreaded first and second yarns, said first yarn comprising a bulky filament yarn and said second yarn consisting essentially of a monofilament of an engineered plastic material, said monofilament having a diameter of about 0.007 to about 0.012 inches and a tensile modulus of at least 100,000 psi, the two yarns being present in a ratio of about one end of bulky yarn to between about one end to about three ends of monofilament.

2. A sleeve according to claim 1, wherein said first yarn has a cotton count of about 0.7 to about 1.5.

3. A sleeve according to claim 1 wherein said first yarn has a cotton count of about 1.1.

4. A sleeve according to claim 1 wherein said sleeve is a braided sleeve.

5. A sleeve according to claim 1 wherein said sleeve is knitted.

6. A sleeve according to claim 1 wherein said first yarn is polypropylene and said second yarn is a polyester monofilament.

7. A sleeve according to claim 6 wherein said second yarn is a polyester monofilament having a tensile modulus of at least 100,000 psi.

8. A sleeve according to claim 1 comprising two ends of monofilament to one end of bulky yarn.

9. A sleeve according to claim 1, wherein said monofilament has a diameter of about 0.010 inches.

* * * * *

UNITED STATES PATENT AND TRADEMARK OFFICE
CERTIFICATE OF CORRECTION

PATENT NO. : 4,989,422

DATED : February 5, 1991

INVENTOR(S) : Barlow et al

It is certified that error appears in the above-identified patent and that said Letters Patent is hereby corrected as shown below:

On the title page:

Please add to the section entitled INVENTORS the following name:

MARIE C. TRESSLAR, Plymouth Meeting, Pa.

Signed and Sealed this

Thirteenth Day of October, 1992

Attest:

DOUGLAS B. COMER

*Attesting Officer*    *Acting Commissioner of Patents and Trademarks*